United States Patent
Courth et al.

(10) Patent No.: US 8,505,873 B2
(45) Date of Patent: Aug. 13, 2013

(54) PRESSURE REGULATING VALVE

(75) Inventors: Christian Courth, Frankfurt (DE); Christoph Voss, Frankfurt (DE); Harald Biller, Eschborn (DE); Joachim Bohn, Hundsangen (DE); Holger Kollmann, Mainhausen (DE); José Garcia-Quilon, Altenstadt/Oberau (DE)

(73) Assignee: Continental Teves AG & Co. oHG (DE)

( * ) Notice: Subject to any disclaimer, the term of this patent is extended or adjusted under 35 U.S.C. 154(b) by 260 days.

(21) Appl. No.: 12/743,278

(22) PCT Filed: Nov. 5, 2008

(86) PCT No.: PCT/EP2008/064964
§ 371 (c)(1),
(2), (4) Date: May 17, 2010

(87) PCT Pub. No.: WO2009/065735
PCT Pub. Date: May 28, 2009

(65) Prior Publication Data
US 2010/0252763 A1 Oct. 7, 2010

(30) Foreign Application Priority Data
Nov. 19, 2007 (DE) .......................... 10 2007 055 126
Aug. 27, 2008 (DE) .......................... 10 2008 039 959

(51) Int. Cl.
*F16K 31/02* (2006.01)

(52) U.S. Cl.
USPC ................................ 251/129.18; 251/129.15

(58) Field of Classification Search
USPC ....... 251/129.15, 129.18; 335/274; 361/139, 361/160
See application file for complete search history.

(56) References Cited

U.S. PATENT DOCUMENTS

| 5,284,317 | A | | 2/1994 | Brehm et al. |
| 5,476,313 | A | * | 12/1995 | Lauer .......................... 303/119.2 |
| 5,603,483 | A | * | 2/1997 | Reuter et al. ............. 251/129.02 |
| 6,021,997 | A | | 2/2000 | Hell |
| 6,022,086 | A | * | 2/2000 | Braum ........................ 303/119.2 |
| 6,659,421 | B1 | * | 12/2003 | Goossens ................. 251/129.18 |
| 7,036,744 | B2 | * | 5/2006 | Hirota .......................... 236/92 B |
| 2004/0262557 | A1 | | 12/2004 | Carrillo et al. |
| 2005/0035320 | A1 | | 2/2005 | Tsuchiya et al. |
| 2006/0202144 | A1 | * | 9/2006 | Ricco et al. ............. 251/129.16 |
| 2006/0218953 | A1 | * | 10/2006 | Hirota ........................... 62/228.5 |
| 2007/0001142 | A1 | * | 1/2007 | Kratzer .................... 251/129.18 |

FOREIGN PATENT DOCUMENTS

| DE | 4035853 C2 | 2/1994 |
| DE | 19710636 C1 | 6/1998 |

(Continued)

Primary Examiner — John K Fristoe, Jr.
Assistant Examiner — Seth Faulb
(74) Attorney, Agent, or Firm — RatnerPrestia

(57) ABSTRACT

A pressure regulating valve having a compression spring fixed in a valve housing for positioning a valve plunger connected to a magnetic armature in the position above a valve seat and not electromagnetically excited, in order to create a connection between at least two pressure medium channels opening into the valve housing, and having a further compression spring disposed coaxially to the first compression spring in the valve housing, having the characteristic that the first compression spring is designed as a control spring forming a stroke and force-specific spring drive by adjusting the spring rates of both compression springs to the force/distance curve of an electromagnet by varying the current in an exciter coil, wherein the further compression spring is designed as a variably adjustable spring acting opposite to the control spring.

13 Claims, 3 Drawing Sheets

(56) References Cited

FOREIGN PATENT DOCUMENTS

| DE | 19716856 A1 | 10/1998 |
|---|---|---|
| DE | 19952800 A1 | 8/2000 |
| DE | 19961609 A1 | 7/2001 |
| DE | 10154257 A1 | 2/2003 |
| EP | 485737 A2 | 5/1992 |
| EP | 0822362 | 2/1998 |
| GB | 2 131621 A | 6/1984 |

* cited by examiner

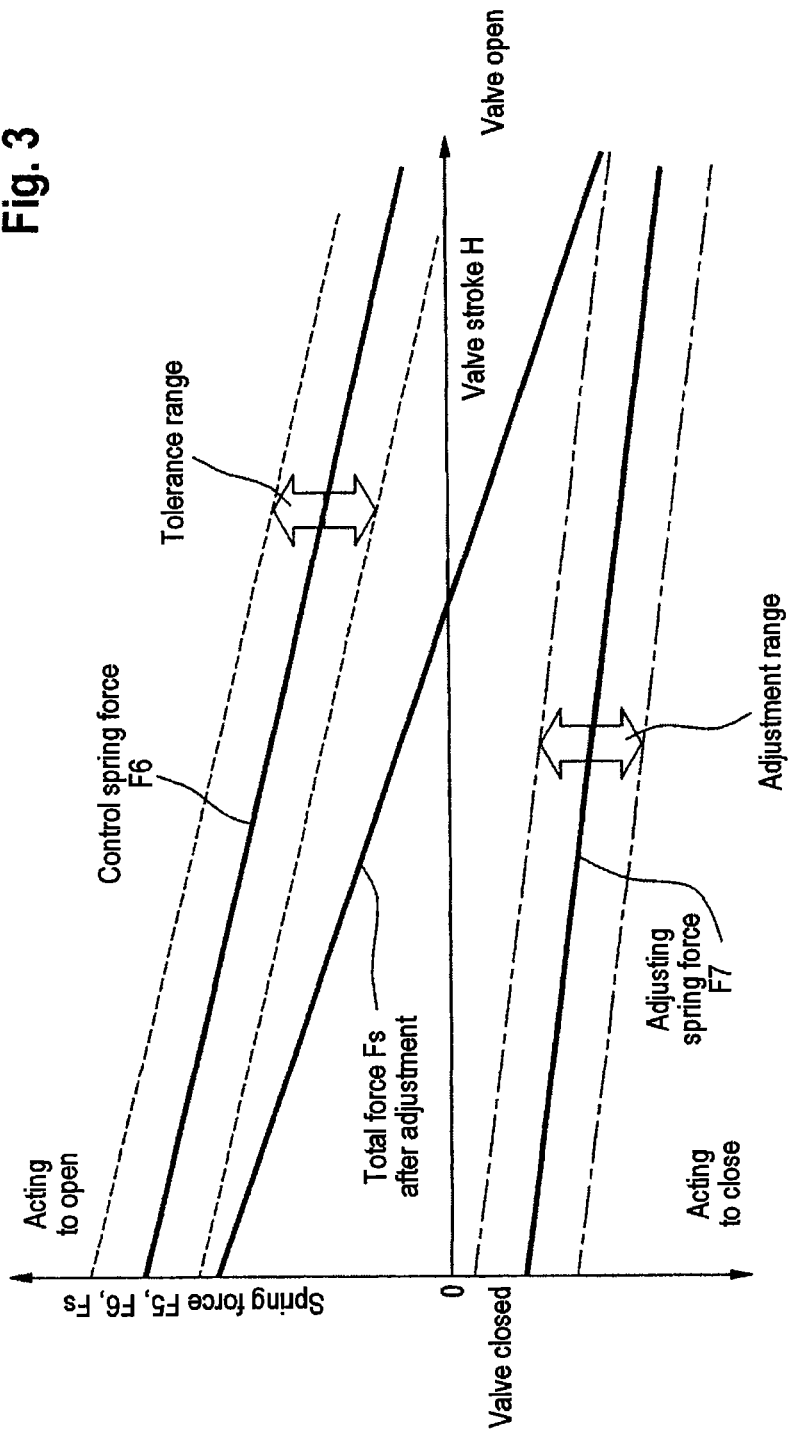

PRESSURE REGULATING VALVE

CROSS REFERENCE TO RELATED APPLICATIONS

This application is the U.S. national phase application of PCT International Application No. PCT/EP2008/064964, filed Nov. 5, 2008, which claims priority to German Patent Application No. 10 2007 055 126.8, filed Nov. 19, 2007 and German Patent Application No. 10 2008 039 959.0, filed Aug. 27, 2008, the contents of such applications being incorporated by reference herein.

BACKGROUND OF THE INVENTION

The invention relates to a valve which is open when unenergized and controllable by analog means, and is referred to hereinafter as a pressure regulating valve, in particular for pressure control in motor vehicle brake systems.

Already known from DE 101 54 257 A1, which is incorporated by reference, is a pressure regulating valve of the type indicated which is used as a wheel inlet valve or block valve, activatable by analog means, in motor vehicle brake systems, for which purpose:
  a) the pressure regulating valve must be designed for the greatest possible precision using precise constructional elements, in particular a narrowly specified compression spring, or
  b) the pressure regulating valve must be adjusted during production to defined function values, an increase or decrease of the working air gap in the electromagnet being used as a manipulated variable.

In both cases the accuracy of the attainable specification is limited, since in case a) the production of more accurate components is not economically possible, while in case b), through the variation of the air gap, the position and tolerance of the opening-current characteristic curve can be configured optimally for only one pressure, the set pressure, while relatively large deviations occur for pressures remote from the set point, depending on the magnitude of the errors to be compensated.

SUMMARY OF THE INVENTION

It is therefore an object of the invention to improve a pressure regulating valve of the type indicated in such a manner that, for the purpose of achieving high accuracy in the transfer function of an exciting current into an actuating force, the advantage of a simply and precisely adjustable air gap can be combined in the production process with the advantage of directly influencing the pressure control characteristic curve in the control system.

In achieving this object the invention relates to the concept that, through the introduction of an additional force component which, at a time within the production process at which other functional elements relevant to the current/pressure transfer function, such as the air gap between the magnetic poles, are already in their final position, the pressure regulating valve can still be adjusted or readjusted.

BRIEF DESCRIPTION OF THE DRAWINGS

The invention is best understood from the following detailed description when read in connection with the accompanying drawings. Included in the drawings is the following features:

FIG. 3 shows a graph for both the pressure regulating valves described, the representative characteristic curve of the total force Fs resulting from the two compression springs and plotted in the direction of the ordinate, and the spring forces F6, F7 of the control and adjusting springs 6, 7 as a function of the valve plunger stroke H from the closed to the fully open valve plunger position, plotted on the abscissa.

DETAILED DESCRIPTION OF THE PREFERRED EMBODIMENTS

Further configurations, features and advantages of the invention are apparent below from the description of a number of drawings according to FIGS. 1 to 3.

Figure 1:
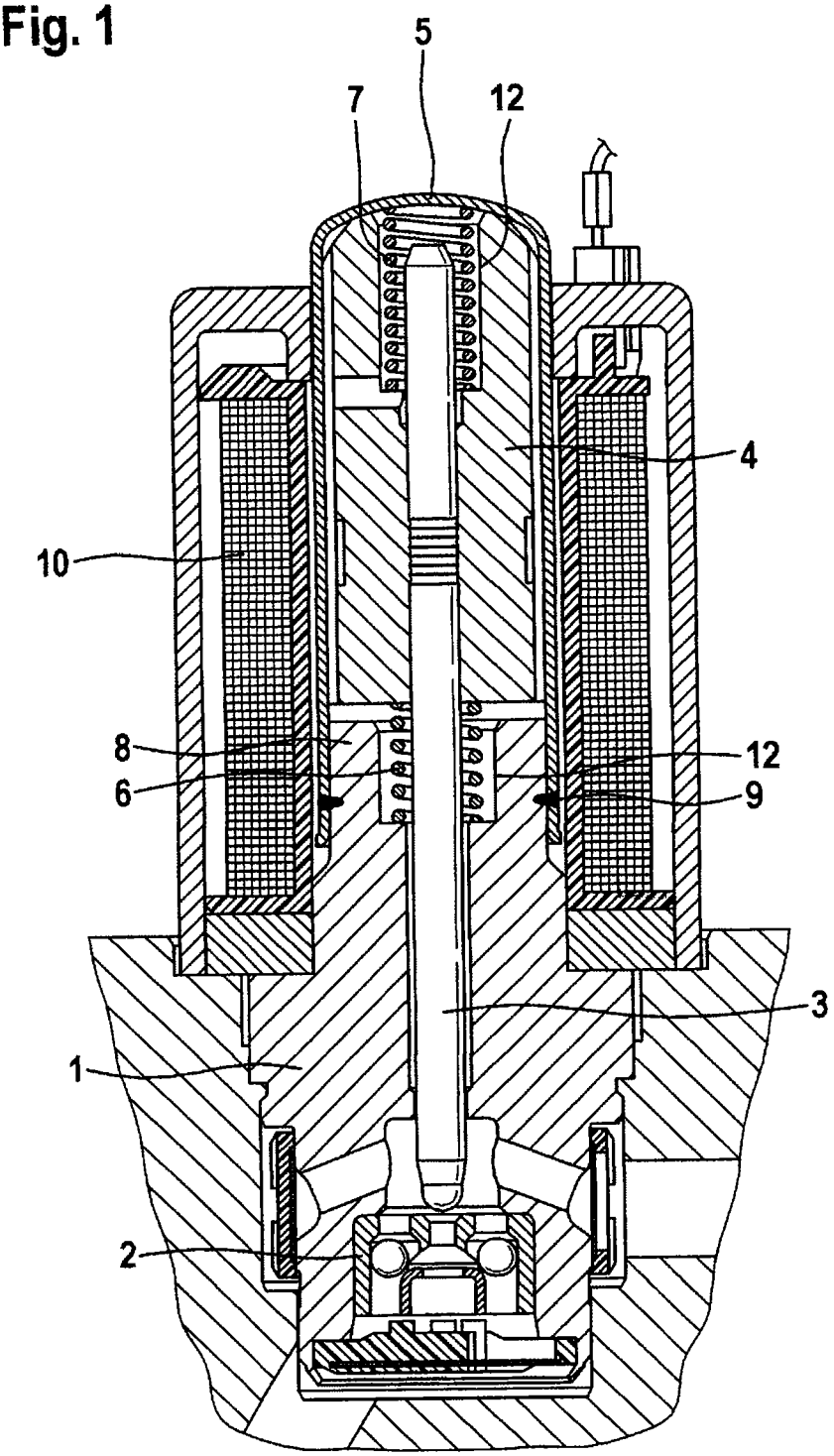
FIGS. 1, 2 each show in longitudinal section a pressure regulating valve with a compression spring fixed in a valve housing.
Figure 2:
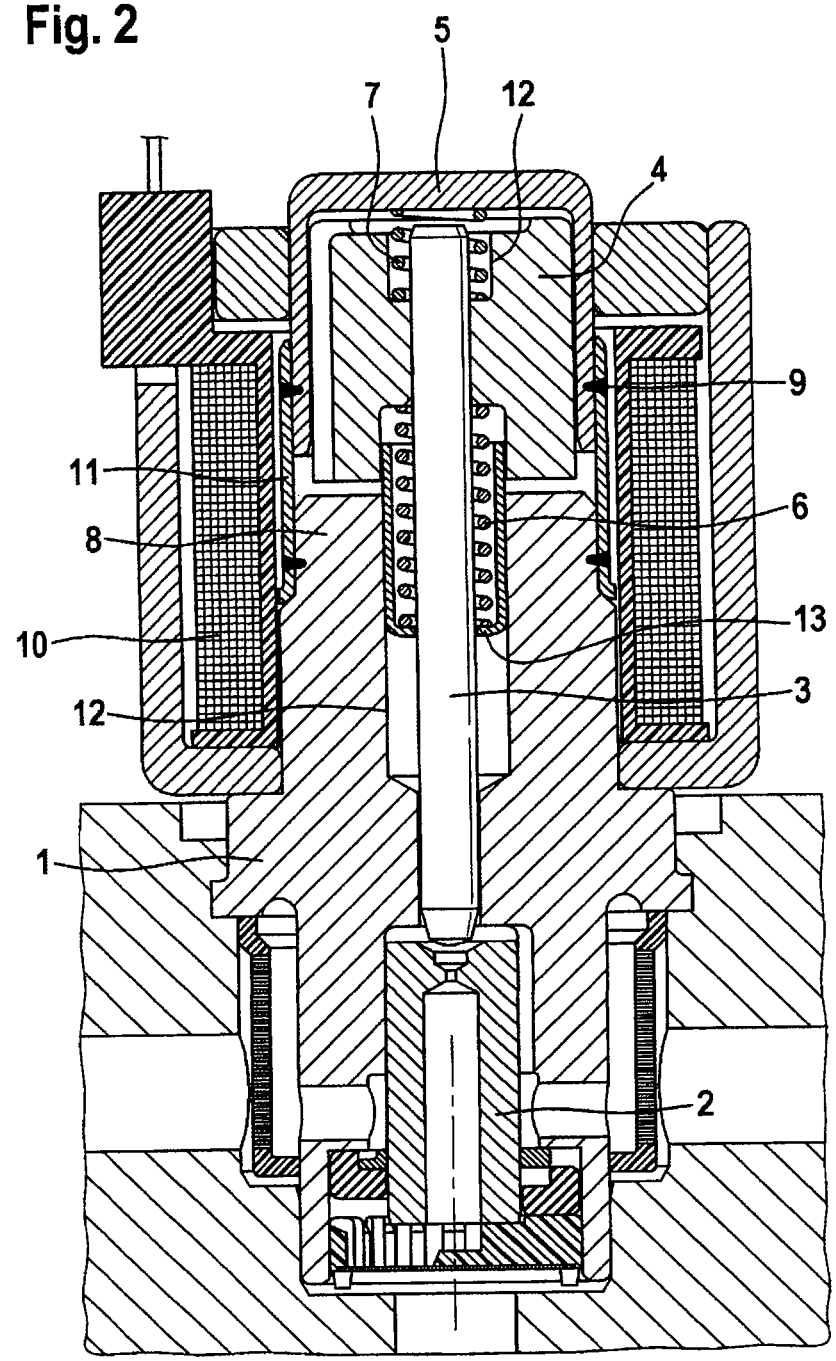

FIGS. 1, 2 each show in longitudinal section a pressure regulating valve with a compression spring fixed in a valve housing 1 for positioning a valve plunger 3, connected to a magnetic armature 4, in the electromagnetically non-excited position raised from a valve seat 2, in order to establish a communication, controllable by analog means, between at least two pressure medium channels which open into the valve housing 1.

In terms of construction, the valve seat 2, as a component of a valve plate, is firmly press-fitted in the cartridge-like valve housing 1, and forms a controllable aperture cross section with the valve plunger 3. By contrast, in all exemplary embodiments the valve plunger 3 is connected positively or non-positively to the magnetic armature 4.

As a result of the analog valve function, the compression spring is in the form of a control spring 6, the spring rate of which, in coordination with the spring rate of an adjusting spring 7 and the force/distance curve of an electromagnet, forms a stroke- and force-specific spring drive through variation of the current in an exciter coil 10. The adjusting spring 7 is in the form of a simply adjustable compression spring acting oppositely to the control spring 6.

The control spring 6 is arranged between the magnetic armature 4 and a magnetic pole section 8 of the valve housing 1, the magnetic pole section 8 having a receptacle 12 in which the control spring 6, through which the valve plunger 3 passes coaxially, is inserted in a space-saving manner.

By contrast, in both exemplary embodiments the adjusting spring 7 is arranged to act oppositely to the control spring 6 between the magnetic armature 4 and a sleeve-shaped valve cap 5 which closes the valve housing 1, the magnetic armature 4 also having a receptacle 12 into which both the adjusting spring 7 and the valve plunger 3 extend. Thus, both the control and the adjusting spring 6, 7 can be advantageously integrated in the valve housing 1 and, in addition, can be precisely guided along the valve plunger 3.

In order to adjust the pretensioning force of the adjusting spring 7, the position of the valve cap 5 can be changed in an axial direction in relation to the magnetic pole section 8, for which purpose the valve cap 5 has a transition fit with respect to the magnetic pole section 8 or to an intermediate sleeve 11, so that, in order to adjust the force of the adjusting spring 7, the valve cap 5 is either guided advantageously in an axially displaceable manner along the magnetic pole section 8, as shown in FIG. 1, or is guided in an axially displaceable manner along the intermediate sleeve 11 which is welded to the magnetic pole section 8, as shown in FIG. 2. In both exemplary embodiments a final fixing of the valve cap 5 is effected by means of a welded connection 9 respectively to the magnetic pole section 8 or to the intermediate sleeve 11.

Through the adjustability of the position of the valve cap 5 with respect to the magnetic pole section 8, tolerances of the control spring 6 as well as tolerances of the magnetic force generated by the electromagnet are compensated as a result of the dynamic effect of the adjusting spring 7 on the control spring 6 via the magnetic armature 4, if an electromagnetic property measured in the process is used as a reference variable for the adjustment.

In the electromagnetically non-excited normal position of the valve plunger 3 raised from the valve seat 2, an equilibrium of forces prevails between the control spring 6 and the adjusting spring 7, whereby the magnetic armature 4 remains in all cases in a defined position with respect to the valve cap 5 and the magnetic pole section 8.

The installation space of the adjusting spring 7 is provided essentially by the free space between the magnetic armature 4 and the valve cap 5 formed by the receptacle 12 and an axial air gap. Before the valve cap 5 is welded in position, this free space is utilized, by pushing the valve cap 5 further in the direction of the valve seat 2, to increase the force of the adjusting spring 7 to a value which corresponds to a desired function value which is measured continuously in the process. What is functionally effective is the total force resulting from both compression springs, whereby tolerances of the control spring 6 as well as tolerances of the magnetic force can be compensated by addition of a greater or lesser force of the adjusting spring 7.

In this connection the graph in FIG. 3 shows, for both the pressure regulating valves described, the representative characteristic curve of the total force Fs resulting from the two compression springs and plotted in the direction of the ordinate, and the spring forces F6, F7 of the control and adjusting springs 6, 7 as a function of the valve plunger stroke H from the closed to the fully open valve plunger position, plotted on the abscissa. It follows from the graph that the unenergized, fully open valve plunger position no longer leads to contacting of the magnetic armature 4 with the valve cap 5, but that, in the equilibrium of forces of both compression springs with a total force Fs=0, the valve plunger 3 is located remote from the end wall of the valve cap 5. The precise adjustment, required hitherto, of a limit stop dimension, which previously had to be set between the magnetic armature 4 and the valve cap 5, is therefore eliminated.

Although the pressure regulating valve is assembled in all its parts at the start of the adjustment process, as illustrated in FIGS. 1 and 2, the valve cap 5 is not yet fixed by means of the welded connection 9 and is initially located in a position further removed axially from the magnetic pole section 8.

For adjustment, the closed end of the valve cap 5 is first moved continuously out of the position further removed from the magnetic pole section 8 in the direction of the magnetic pole section 8. As this happens the exciter coil 10 is subjected either to a constant or to a time-variable electric current and the electromagnetic reference variable, which has a correlation to the desired transfer function of current to pressure, is identified continuously or iteratively. This process is continued until the reference variable reaches the desired target value; the forward feed acting on the valve cap 5 is then ended and the valve cap 5 is then fixed in this adjustment position by welding thereof to the valve housing 1 or to the intermediate sleeve 11.

As possible reference variables for positioning the valve cap 5, the following, in addition to others, are especially advantageous:

measuring the drop-out current of the pressure regulating valve by evaluating the current behavior during cyclically recurrent valve switching, so that the position of the valve cap 5 with respect to the magnetic pole section 8 is set as a function of the current behavior in the exciter coil 10 during cyclically recurrent electromagnetic activation of the valve plunger 3, measuring the flow through the open valve seat 2 at a predefined electrical energization of the exciter coil 10, measuring the movement of the valve plunger 3 in the direction of the valve closed position as a result of energization of the exciter coil 10 according to a defined current pattern, measuring the force acting on the valve plunger 3 from the magnetic drive.

In addition, deviations from the value of the effective sealing diameter between the valve plunger 3 and the valve seat 2 can be corrected by identifying the reference variable under a pneumatic test pressure.

The following further advantages of the pressure regulating valve according to aspects of the invention may be mentioned:

1. The addition of the spring rates of the two compression springs (control spring 6 and adjusting spring 7) makes possible designs with spring rates which are higher than could be produced economically with only one compression spring.

2. By raising the force level of the control spring 6, production thereof within narrow tolerances is simplified; tolerances of the control spring 6 may optionally be of generous dimensions, whereby costs in testing and sorting the compression springs can be reduced.

3. Because of the clearance from the valve cap 5, switching noises of the magnetic armature 4 are avoided.

4. If a magnetizable valve cap 5 is used, the adjusting spring 7 may be configured in such a manner that magnetic adhesion between the magnetic armature 4 and the valve cap 5 is prevented, so that a so-called anti-adhesion disk can be saved.

The adjustment principle is universally applicable; that is, it is also suitable for pressure regulating valves which are closed when unenergized.

To conclude the preceding explanations regarding the pressure regulating valves illustrated in FIGS. 1, 2, constructional differences which deserve especial mention regarding the pressure regulating valve according to FIG. 2 are briefly stated below.

Specifically, in deviation from FIG. 1, the pressure regulating valve according to FIG. 2 shows that the control spring 6 does not necessarily have to be supported directly in the receptacle 12 of the magnetic pole section 8, but may alternatively bear against a sleeve-shaped stop 13 press-fitted into the valve housing 1, the portion of which stop 13 projecting from the magnetic pole section 8 advantageously makes possible internal centering of the magnetic armature 4. In addition, in order to reduce magnetic resistance, the valve cap 5 is advantageously produced from a magnetic-flux conducting material, whereas the intermediate sleeve 11 welded to the magnetic pole part is implemented non-magnetically.

The invention claimed is:

1. A pressure regulating valve comprising:
a first compression spring fixed in a valve housing for positioning a valve plunger connected to a magnetic armature in an electromagnetically non-excited position raised from a valve seat, in order to establish a communication, controllable by analog means, between at least two pressure medium channels opening into the valve housing,
a second compression spring arranged in the valve housing coaxially with the first compression spring,
a sleeve-shaped cap for setting and maintaining a force of the second compression spring at a pre-determined value wherein a position of the sleeve-shaped cap is set as a function of a selected current value in an exciter coil, and wherein the first compression spring is in the form of a control spring and the second compression spring is in the form of a variably adjustable adjusting spring acting oppositely to the control spring, the control spring and the adjusting spring being configured in such a manner that, through a coordination of a total force (Fs) and spring rates of the two compression springs with a force/distance curve of an electromagnet, a stroke-specific and force-specific spring drive is formed through variation of current in the exciter coil.

2. The pressure regulating valve as claimed in claim 1, wherein the control spring is arranged between the magnetic armature and a magnetic pole section of the valve housing, the magnetic pole section having a receptacle in which the control spring, through which the valve plunger passes coaxially, is inserted.

3. The pressure regulating valve as claimed in claim 1, wherein the control spring and the adjusting spring are guided along the valve plunger.

4. The pressure regulating valve as claimed in claim 1, wherein the adjusting spring is arranged between the magnetic armature and the sleeve-shaped valve cap of the valve housing, and wherein the magnetic armature has a receptacle into which the adjusting spring and the valve plunger extend.

5. The pressure regulating valve as claimed in claim 4, wherein, in order to adjust a force of the adjusting spring in an axial direction, a position of the valve cap can be changed in relation to the magnetic pole section.

6. The pressure regulating valve as claimed in claim 5, wherein the valve cap has a transition fit with respect to the magnetic pole section, so that, in order to adjust a force of the adjusting spring, the valve cap is configured to be displaceable axially and to be fixable by a welded connection.

7. The pressure regulating valve as claimed in claim 5, wherein, by changing the position of the valve cap with respect to the magnetic pole section, component tolerances of the control spring and tolerances of a magnetic force generated by the electromagnet can be compensated as a result of the adjustment of the force of the adjusting spring.

8. The pressure regulating valve as claimed in claim 5, wherein, in the electromagnetically non-excited position of the valve plunger raised from the valve seat, an equilibrium of forces prevails between the control spring and the adjusting spring, whereby the magnetic armature remains at all times in a defined position with respect to the valve cap and the magnetic pole section.

9. The pressure regulating valve as claimed in claim 5, wherein the position of the valve cap with respect to the magnetic pole section is set as a function of a current behavior in the exciter coil during cyclically recurrent electromagnetic activation of the valve plunger.

10. The pressure regulating valve as claimed in claim 5, wherein the position of the valve cap with respect to the magnetic pole section is set as a function of a flow through the valve seat as a result of defined electrical energization of the exciter coil.

11. The pressure regulating valve as claimed in claim 5, wherein the position of the valve cap with respect to the magnetic pole section is set as a function of an activation of the valve plunger in a direction of the valve closed position as a result of energization of the exciter coil according to a defined current pattern.

12. The pressure regulating valve as claimed in claim 5, wherein the position of the valve cap with respect to the magnetic pole section is set as a function of the force transmitted by the magnetic drive to the valve plunger upon energization of the exciter coil according to a defined current pattern.

13. A pressure regulating valve comprising:
a first compression spring fixed in a valve housing for positioning a valve plunger connected to a magnetic armature in an electromagnetically non-excited position raised from a valve seat, in order to establish a communication, controllable by analog means, between at least two pressure medium channels opening into the valve housing,
a second compression spring arranged in the valve housing coaxially with the first compression spring,
a sleeve-shaped cap for setting and maintaining a force of the second compression spring at a pre-determined value wherein a position of the sleeve-shaped cap is set as a function of a selected current value in an exciter coil, and
a sleeve welded to the sleeve shaped cap on a first end thereof and welded to the valve housing on a second end thereof,
wherein the first compression spring is in the form of a control spring and the second compression spring is in the form of a variably adjustable adjusting spring acting oppositely to the control spring, the control spring and the adjusting spring being configured in such a manner that, through a coordination of a total force (Fs) and spring rates of the two compression springs with a force/distance curve of an electromagnet, a stroke-specific and force-specific spring drive is formed through variation of current in the exciter coil.

* * * * *